United States Patent [19]

Furuhama

[11] 4,452,464
[45] Jun. 5, 1984

[54] OIL RING

[76] Inventor: Shoichi Furuhama, 6-3, Okusawa 5-chome, Setagaya-ku, Tokyo, Japan

[21] Appl. No.: 480,928

[22] Filed: Mar. 31, 1983

[30] Foreign Application Priority Data

Apr. 3, 1982 [JP] Japan ............................. 57-47809[U]

[51] Int. Cl.³ ............................................... F16J 9/00
[52] U.S. Cl. ..................................... 277/216; 277/236
[58] Field of Search ................................. 277/216–224, 277/236

[56] References Cited

U.S. PATENT DOCUMENTS 3,545,775 12/1970 Drasse .................................. 277/216
3,751,047 8/1973 McGee ................................. 277/216
4,299,401 11/1981 McCormick ......................... 277/216

Primary Examiner—Robert I. Smith
Attorney, Agent, or Firm—Birch, Stewart, Kolasch & Birch

[57] ABSTRACT

An oil ring having an axially and radially thin cross-section and a single cylinder contacting face to bear against the cylinder wall with a pressure of 2 Kg/cm² to 6 Kg/cm². The oil ring is dimensioned to satisfy the following equations:

$$0.01 \leq B/D \leq 0.025 \quad (1)$$

$$T/B \leq 4 \quad (2)$$

$$0.1 \leq t/B \leq 0.5 \quad (3)$$

where B is the axial height of the oil ring; D is the outer diameter of the oil ring; T is the radial thickness of the oil ring; and t is the width of the cylinder contacting face.

6 Claims, 8 Drawing Figures

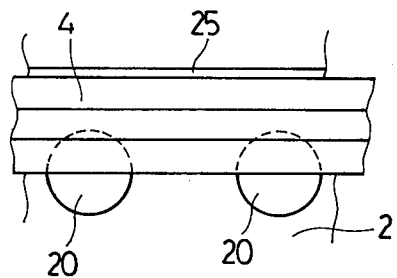
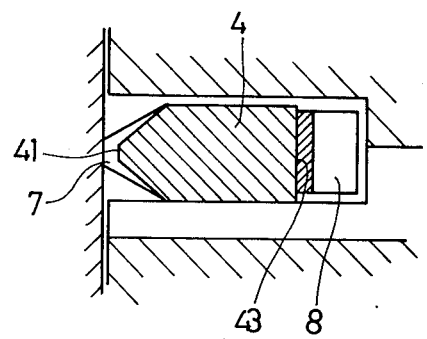
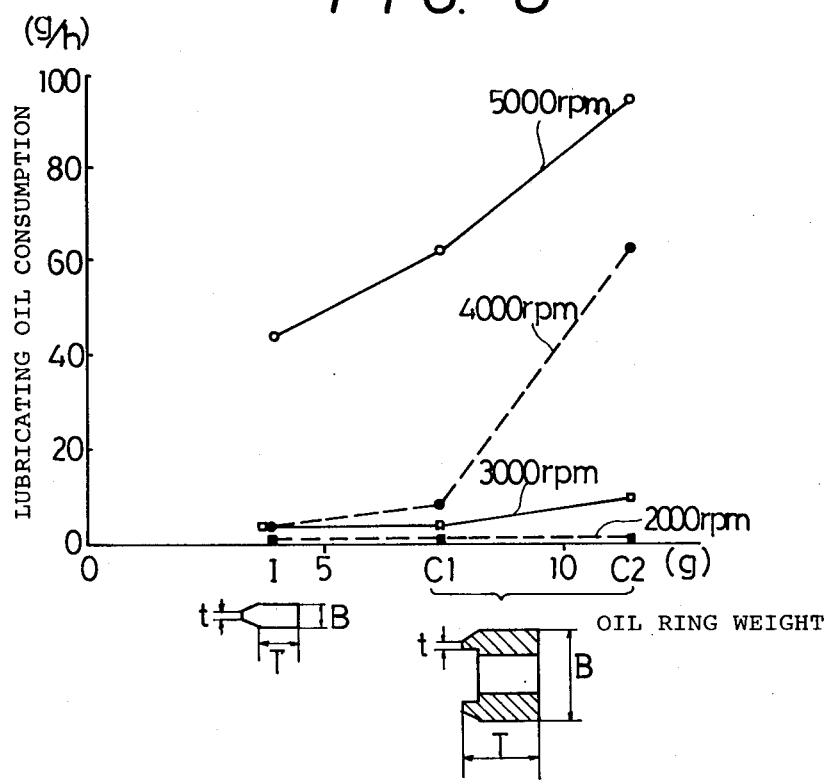

OIL RING

BACKGROUND OF THE INVENTION

The invention relates to an oil ring assembly for control of lubricating oil in internal combustion engines and reciprocating compressors.

In general, a piston ring device for use in an internal combustion engine comprises a compression ring assembly composed of at plurality of compression rings for gas-seal of a clearance between a cylinder and a piston and an oil ring assembly consisting of an oil ring fitted in an oil ring groove below the lower compression ring and drain holes extending from the side periphery to the inside of the piston. The oil ring assembly is utilized to form lubricating oil film between the compression ring and the cylinder and collect oil therefrom to a crank case.

The oil ring is less affected by combustion pressure but more influenced by the inertia force due to it own mass, as compared with the compression ring. Although gas pressure exerts no serious action to the back of the oil ring, the pressure acting on the front of the oil ring is important for formation of lubricating oil film. The known oil ring is provided with two upper and lower cylinder contacting faces and an expander, such as a coil spring, for expanding the oil ring radially to the cylinder with a high pressure to obtain a good oil-scraping effect.

One type of the known oil rings is integrally formed with two upper and lower cylinder contacting faces and a drain window therebetween to perform a so-called check-valve action. The oil ring is seated on the lower side of the oil ring groove during the upward stroke of piston and on the upper side of the oil ring groove during the downward stroke of piston to scrape out oil into the drain hole in the piston. The upper and lower cylinder contacting faces are expected to obtain a double oil-scraping effect.

However, the two upper and lower cylinder contacting faces make the oil ring taller and more massive, so that, in high speed operations, the oil ring performs an insufficient check-valve action and brings increasement in oil consumption. Furthermore, the face is relatively wide to need a high cylinder contacting pressure for formation of an appropriate oil film. This leads to increase in friction loss. Besides, the known axially large oil ring makes the piston or engine taller, heavier and more fuel-consumptive.

The other known type is usually employed in a gasoline engine. It is composed of two independent rails of copper and a spacer expander for urging the rails into close contact with the cylinder wall. It is radially flexible and well followable to the cylinder wall. The rails make the oil ring groove airtight to prevent it from scraping up oil. However, the oil ring is impossible to shorten the axial height to the extent that friction loss is reduced. Besides, it is not easy to be set in the oil ring groove.

In brief, the most important problem in the known oil ring is a relatively large consumption of lubricating oil in high speed operations in which the oil ring is less followable to the cylinder. Another problem is that the known oil ring is impossible to decrease friction loss. A further problem is that the know oil ring is too taller to lighten the engine.

For the purpose of solving the problems as described above, Japanese Patent Publication Sho No. 47-19650 discloses an oil ring with two thin rails. Japanese Utility Model Application Publication Sho 55-41502 discloses another oil ring with a single rail. However, the oil ring as disclosed has disadvantages one of which is that the expander prevents axial movement or check valve action of the rail. Another disadvantage is that the thin rail is distorted by the cylinder contacting pressure in the dish-like form to fail in sealing the oil ring groove.

SUMMARY OF THE INVENTION

It is an object of the invention to provide an oil ring assembly that is superior in control of lubricating oil.

It is another object of the invention to provide an oil ring assembly that is capable of reducing friction loss.

It is a further object of the invention to provide an oil ring assembly that is contributable to engine-lightening.

For accomplishment of these objects, the oil ring of the invention is less massive, thinner and more rigid to satisfy the equations: $0.01 \leq B/D \leq 0.025$ and $T/B \leq 4$, where B is the axial height of the oil ring, D is the outer diameter of the oil ring, and T is the radial thickness of the oil ring. The oil ring is formed with a single cylinder contacting face to bear against the cylinder wall with a pressure of 2 to 6 Kg/cm$^2$ and dimensioned to satisfy the following equation: $0.1 \leq t/B \leq 0$, where t is the width of the cylinder contacting face.

BRIEF DESCRIPTION OF THE DRAWINGS

FIG. 6 is an enlarged fragmentary elevational view of the oil ring assembly;

FIG. 7 is a view similar to FIG. 1 and illustrates another embodiment; and

FIG. 8 is a chart showing the result of a test for comparison between the inventive and conventional oil rings

DESCRIPTION OF THE PREFERRED EMBODIMENTS

Figure 1:
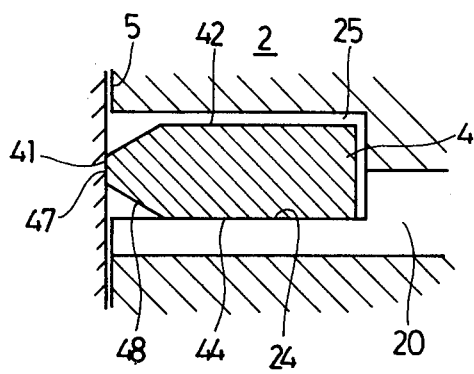
FIG. 1 is an enlarged fragmentary cross-sectional view of the oil ring assembly according to the invention and illustrates the state during the upward stroke of piston.
Figure 2:
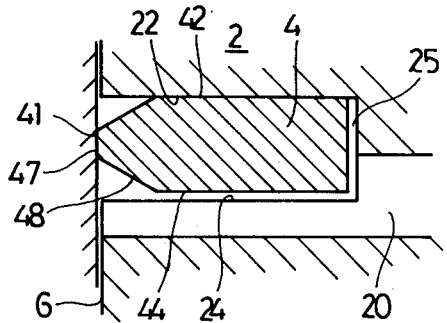
FIG. 2 is a view similar to FIG. 1 and illustrates the state during the downward stroke of piston.

Referring to FIGS. 1 and 2 which illustrate the oil ring 4 in the respective upward and downward strokes of piston, the oil ring 4 is set in the oil ring groove 25 to perform a perfect check-valve action in the both strokes. In the upward stroke, as seen in FIG. 1, oil ring 4 has its bottom surface 44 seated on the lower side 24 of the oil ring groove 25 to remove oil from the land 5 of the piston 2 to drain hole 20 along the top surface 42 of the oil ring 4. In the downward stroke, as seen in FIG. 2, it has its top surface 42 seated on the upper side 22 of the oil ring groove 25 to remove oil from piston skirt 6 to drain hole 20 along the bottom side 24 of the oil ring. The top surface 42 of the oil ring as well as the upper side 22 of the oil ring groove is desirable to be accurately finished to perform the check-valve action.

Figure 3:
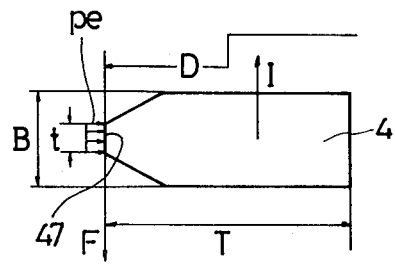
FIG. 3 shows dimensions of and forces acting on the oil ring.

A resultant force of friction force F and inertia force I acts on the oil ring 4 as seen in FIG. 3. The friction force F is in proportion to the product among the outer diameter D of oil ring, the width t of cylinder contacting face 47 and cylinder contacting pressure pe. The inertia force I is proportional to the product of the mass of oil ring and the square of number of rotation.

Figure 4:
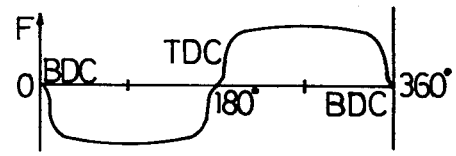
FIG. 4 is a diagram showing a relationship between friction force and crank-angle.
Figure 5:
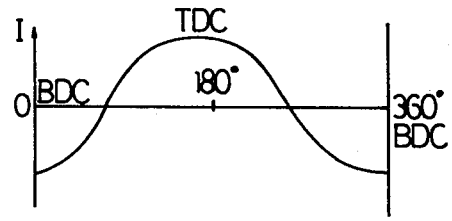
FIG. 5 is diagram showing a relationship between inertia force and crank-angle.

Friction force F and inertia force I are diagarammatically shown in reference to crank angle in FIGS. 4 and 5, the inertia force curve has a phase-lag of about 105 degrees with respect to the friction force. As the inertia force reduces, the check-valve action is more effective. If the resultant force of inertia and friction forces becomes zero near top and bottom dead centers (TDC and BCD), the check-valve action is effective. This is obtained by reducing the inertia force or weight of the oil ring. The oil ring should be rigid enough to resist dish-like distortion. Otherwise, it would be distorted into the dished form to fail in oil-sealing the oil ring groove at the upper or lower side thereof and have its cylinder contacting face abnormally pressed on the cylinder, resulting in that friction loss abruptly increases.

The oil ring of the invention has its axial height B reduced for lightening the weight, as shown in FIG. 3. If the radial thickness were reduced, its expansive force which is proportional to the friction force is too lowered. The rigidity of the oil ring is mostly determined both by the expansive force and the ratio of T to B, so that it becomes small as the expansive force or T/B increases. Therefore, it is preferable for B/D to be within a range of 0.01 to 0.025 and for T/B to be less than 4. The ratio of B/D should be less than 0.025 to reduce the mass of the oil ring and more than 0.01 to give a necessary rigidity to the oil ring. On the other hand, neither oil ring groove will be machined with precision nor oil ring will have a sufficient strength, if B/D is less than 0.01. The ratio T/B should be beyond 4 and otherwise the oil ring will be less rigid and fail the check-valve action.

The expansive force of the oil ring is proportional to 3 power of T, so that the oil ring will have an appropriate expanding force if T/B is larger than 1.5. But, if the oil ring is provided with an expanding member, such as a spring, T/B can be less than 1.5.

In the oil ring of the invention, B as well as B/D is small enough to reduce the height of the piston or engine and increase engine efficiency. The one and only cylinder contacting face 47 on the outer periphery of the oil ring has a width t determined by the equation $0.1 \leq t/B \leq 0.5$ and bears against the cylinder wall with a pressure of 2 to 6 Kg/cm$^2$. The oil ring should have a small self-expanding force, because the axial height B as well as the radial thickness T is small. This is obtained by narrowing the width t of the cylinder contacting face 47.

The oil ring is intended to control the thickness of lubricating oil film. The thickness of oil film decreases as the cylinder contacting pressure increases if t is fixed. It also decreases as t decreases if the cylinder contacting pressure is fixed. The cylinder contacting pressure as well as the width of the cylinder contacting face is so reduced to maintain an appropriate thickness of oil film, resulting in that friction loss also decreases because of being proportional to the product of the cylinder contacting pressure and the width of the cylinder contacting face.

The cylinder contacting pressure of 2 to 6 Kg/cm$^2$ is small in comparison with the usual of 8 Kg/cm$^2$. If t/B>0.5, neither friction loss is reduced nor lubricating oil is controlled, because the oil ring is narrow and inferior in self-expanding character to thicken oil-film on the cylinder contacting face. On the other hand, if t/B<0.1, the width t is too narrow in respect to the roughness of the cylinder and poor both in fittness and following to the cylinder. Thus, the ratio t/B is maintained in a range of 0.1 to 0.5. The cylinder contacting pressure should not exceed 6 Kg/cm$^2$. If the cylinder contacting pressure were more than 6 Kg/cm$^2$, the oil ring should be wider to increase friction loss and otherwise it would be distorted. If it were smaller than 2 Kg/cm$^2$, the width t would be too narrow. Therefore, it must be in a range of 2 to 6 Kg/cm$^2$.

In the oil ring of the invention, the cylinder contacting pressure is about one half to the usual of about 8 Kg/cm$^2$ and the width of the cylinder contacting face is about one third to the conventional width of about 0.8 mm which is the sum of the upper and lower cylinder contactig faces, resulting in that friction loss can be reduced to about one fifth of the conventional one. It will be understood that friction loss decreases to half since the two upper and lower cylinder contacting faces are substituted by a single thin face.

The outer periphery 41 is cut by one or both of upper and lower conical or slanting surfaces intersecting the upper and lower surfaces 42, 44 of the oil ring with a sharp angle to form the cylinder contacting face 47, as seen in FIGS. 1 and 2. The abrupt slanting surfaces 48 maintains the width of the cylinder contacting face 47 substantially constant even if the face wears and defines a wide void between the lower side 24 and the slanting surface 48 to reserve and then drain excessive oil to drain hole 20. The drain hole 20 extends from the lower side 24 of the oil ring groove 25 to the inside of piston 2. As seen in FIG. 6, the inventive oil ring assembly has a single sort of drain holes 20 opened to the side periphery of piston 2 and the back and lower sides of the oil ring groove 25 in which oil ring 4 is fitted. In contrast, the conventional oil ring assembly has a first drain hole in the back of the oil ring groove and a second drain hole below the oil ring groove.

If the cylinder contacting pressure is insufficient, the oil ring 4 may have the back 43 thereof backed by a usual expanding member 8, such as a spring, as seen in FIG. 7. Also the oil ring 4 may have the outer periphery 41 thereof covered by a hard covering 7 of chrome plating of nitriding.

As described above, the oil ring has both the axial height and the radial thickness reduced to lighten the weight of the oil ring and decrease the inertia force. Even at high speed operations, the oil ring performs a check-valve action to remarkably reduce oil consumption. Furthermore, the oil ring has a reduced friction loss and contributes to engine-lightening due to the thin width of the oil ring.

A test was made to show the effect resulted from the oil ring of the invention in comparison with the known ring. The following test conditions were used:

INVENTIVE OIL RING: I: 3.9 g, B=1.0 mm, T=2.65 mm, and t=0.3 mm
KNOWN OIL RING: C1; 11.4 g, B=4.0 mm, T=2.65 mm, and t=0.5 mm
KNOWN OIL RING: C2: 8.1 g, B=2.0 mm, T=3.4 mm, and t=0.5 mm
Diameter: 73 mm,
Cylinder contacting pressure: 43 Kg/cm
ENGINE:
Diameter: 73 mm,
Stroke: 77 mm, Lubricating oil SAE No. 20
Compression ring: two rectangular section rings
Test Method: Measuring lubricating oil consumption at 2000, 3000, 4000, and 5000 rpm The result of test is shown in FIG. 8 in which there is a chart giving a relationship between lubricating oil consumption and oil ring weight. The chart indicates that oil consumption decreases with reduction in oil ring weight as well as in the width of cylinder contacting face and that this is more apparent in the range of high rotational speeds.

What is claimed is:

1. In an oil ring assembly having a piston, an oil ring groove formed in the side periphery of said piston, an oil ring fitted in said oil ring groove, and a plurality of drain holes extending radially from said oil ring groove to the inside of said piston, said oil ring comprising a single cylinder contacting face formed on the side periphery thereof, said cylinder contacting face being arranged to undergo a cylinder contacting pressure of 2 to 6 Kg/cm², said oil ring and said cylinder contacting face being dimensioned to satisfy the following equations:

$$0.01 \leq B/D \leq 0.025 \tag{1}$$

$$T/B \leq 4 \tag{2}$$

$$0.1 \leq t/B \leq 0.5 \tag{3}$$

where B is the axial height of said oil ring; D is the outer diameter of said oil ring; T is the radial thickness of said oil ring; and t is the width of the cylinder contacting face of said oil ring.

2. In an oil ring assembly as claimed in claim 1, wherein said cylinder contacting face is defined by upper and lower conical surfaces respectively intersecting the top and bottom surface of said oil ring at a sharp angle.

3. In an oil ring assembly as claimed in claim 1, wherein said drain hole opens to the side periphery of said piston and the back and lower sides of said oil ring groove.

4. In an oil ring assembly as claimed in claim 1, wherein said oil ring is provided with an expander for backing up said oil ring.

5. In an oil ring assembly as claimed in claim 1, wherein said oil ring has the side periphery thereof covered by a hard covering.

6. In an oil ring assembly as claimed in claim 3, wherein said lower conical surface forms an annular void on the lower side of said oil ring groove to reserve and let flow oil to said drain holes.

* * * * *